United States Patent
Van Hillo et al.

(10) Patent No.: US 10,729,147 B2
(45) Date of Patent: *Aug. 4, 2020

(54) PROCESSING APPARATUS FOR POULTRY COMPRISING ONE OR MORE TRANSFER UNITS

(71) Applicant: Meyn Food Processing Technology B.V., Oostzaan (NL)

(72) Inventors: Eric Adriaan Van Hillo, Oostzaan (NL); Aloysius Christianus Van Steijn, Oostzaan (NL); Jan Willem Hagendoorn, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,171

(22) Filed: Apr. 15, 2019

(65) Prior Publication Data

US 2019/0313656 A1    Oct. 17, 2019

(30) Foreign Application Priority Data

Apr. 16, 2018   (NL) ..................................... 2020773

(51) Int. Cl.
*A22B 7/00* (2006.01)
*A22C 21/00* (2006.01)
*B65G 47/61* (2006.01)
*B65G 47/84* (2006.01)

(52) U.S. Cl.
CPC .......... *A22C 21/0053* (2013.01); *A22B 7/005* (2013.01); *A22C 21/0046* (2013.01); *B65G 47/61* (2013.01); *B65G 47/848* (2013.01); *A22B 7/001* (2013.01)

(58) Field of Classification Search
CPC ........................... A22B 7/005; A22C 21/0053
USPC ......................................................... 452/182
See application file for complete search history.

(56) References Cited

U.S. PATENT DOCUMENTS

| | | | |
|---|---|---|---|
| 5,453,045 A * | 9/1995 | Hobbel | A22C 21/0053 452/182 |
| 7,837,540 B2 * | 11/2010 | van den Nieuwelaar | A22C 21/0046 452/177 |
| 8,708,785 B2 | 4/2014 | Aandewiel et al. | |
| 8,986,082 B2 | 3/2015 | Aandewiel et al. | |

(Continued)

FOREIGN PATENT DOCUMENTS

EP    2687101 A1    1/2014

OTHER PUBLICATIONS

PCT Search Report for application NL 2020773, dated Apr. 16, 2018.

(Continued)

*Primary Examiner* — David J Parsley
(74) *Attorney, Agent, or Firm* — Dority & Manning, P.A.

(57) ABSTRACT

Processing apparatus for poultry that may include one or more transfer units placed intermediate and conveying poultry from a first line to a subsequent second line. The transfer means may include at least one magnet for inducing eddy currents in a circulating support that counteracts relative motion between the transfer means and the circulating support. The at least one magnet may be embodied with a series of alternating north-poles (+) and south-poles (−) facing the circulating support.

11 Claims, 3 Drawing Sheets

(56) References Cited

U.S. PATENT DOCUMENTS 9,198,442 B2 * 12/2015 Peters ................ A22C 21/0053

OTHER PUBLICATIONS

Jin Yinxi et al., "Magnetic and Thermal Analysis of a Halbach Permanent Magnet Eddy Current Brake, Department", 2016 19$^{th}$ International Conference on Electrical Machines and Systems (ICEMS), The Institute of Electrical Engineers of Japan, Nov. 13, 2016 (D2).
Min-Gyu Park et al., "Torque analysis and measurements of a permanent magnet type Eddy current brake with a Halbach magnet array based on analytical magnetic field calculations", Journal of Applied Physics vol. 115, 17E707, May 7, 2014 (D3).
Seok-Myeong Jang et al., "The Application of Linear Halbach Array to Eddy Current Rail Brake System", IEEE Transactions on Magnetics vol. 37, No. 4, Jul. 1, 2001 (D4).

* cited by examiner

PROCESSING APPARATUS FOR POULTRY COMPRISING ONE OR MORE TRANSFER UNITS

PRIORITY STATEMENT

The present application claims priority under 35 U.S.C. § 119 to Dutch Application No. 2020773, filed Apr. 16, 2018.

FIELD OF THE INVENTION

The subject matter of the present disclosure relates generally to a processing apparatus for poultry.

BACKGROUND OF THE INVENTION

Such a processing apparatus is known from EP-B-0 736 255 and from EP-B-0 782 823, both in the name of the applicant.

EP-B-1 848 282 discloses another, more complex type of processing apparatus intended for the same functionality as the processing apparatus according to the preamble, in which a drive is applied for jointly driving a plurality of transfer means, and coupling means associated with each transfer means for coupling to the drive.

The transfer units forming part of the processing apparatus according to the preamble are operative in a relatively polluted environment, due to the grease and blood escaping from the poultry that is being processed. This grease and blood may even mingle with water that is applied in or around the processing apparatus, and the grease and blood may partly solidify. All in all the conditions prevailing in the processing apparatus of the preamble are unpredictable and result at times in poor reliability in the transfer of the poultry from a first line to a subsequent second line selected from the group comprising a slaughtering line, an evisceration line, a chilling line, a sorting line and a cutup line. This will even get worse and possibly unacceptable with increasing speed of processing. Current processing speeds are at a level of handling 8000 chickens per hour, but industry is aiming to processing speeds of at least 12,000 chickens per hour and possibly 15,000 chickens per hour. Certainly at these increased processing speeds, the prior art processing apparatus is unsuitable.

According to the invention, this problem is addressed to a great extent if not entirely by the processing line and the transfer means in accordance with one or more of the appended claims.

It is remarked that EP-B-2 687 101 teaches a processing line wherein the circulating support comprises material that is magnetically conductive and that the transfer means are provided with at least one magnet so as to induce eddy currents in the circulating support to counteract relative motion between the transfer means and the circulating support. Obviously the circulating support of EP-B-2 687 101 comprises therefore material that is susceptible to eddy currents. This requires material that supports electrical current and is sensitive to magnetic field variations for the inducement of the eddy currents.

BRIEF DESCRIPTION OF THE INVENTION

In certain exemplary aspects, the present invention may provide one or more transfer units placed intermediate and conveying poultry from a first line to a subsequent second line, wherein both the first line and the second line are selected from the group including a slaughtering line, an evisceration line, a chilling line, a sorting line, a cutup line, and/or another type of line or lines. Each transfer unit may be embodied with a circulating support onto which a plurality of transfer means are mounted that in a not obstructed situation do not carry out a relative movement with respect to the support, yet in an obstructed situation are able to move relative to the support. The circulating support may be arranged to convey the transfer means between a supply station at the side of the first line and a discharge station at the side of the second line and vice versa.

One exemplary object of the invention to provide a solution that enables the skilled person to avoid the pitfalls of the prior art.

Another exemplary object is to improve the stability of the carriers during weighing.

In another exemplary aspect, the invention may provide that the at least one magnet is embodied with a series of alternating north-poles (+) and south-poles (−) facing the circulating support. Sandwiched between each of these alternating north-poles (+) and south-poles (−) can be a combination of a north-pole (+) and a south-pole (−), which combination of north-pole (+) and south-pole (−) is shifted over an angle of $\pi\backslash 2$ radians with reference to the alternating north-poles (+) and south-poles (−) on opposite sides of the combination of north-pole (+) and south-pole (−).

At the side facing the circulating support, a north-pole of the series of alternating north-poles (+) and south-poles (−) may be positioned immediately adjacent to a north-pole (+) of the shifted combination of a north-pole (+) and south-pole (−). At the side facing the circulating support a south-pole (−) of the series of alternating north-poles (+) and south-poles (−) may be immediately adjacent to a south-pole (−) of the shifted combination of a north-pole (+) and south-pole (−).

The configuration of the at least one magnet according to the previous paragraph may be known by the skilled person under the name Halbach array and has several advantages including increasing the magnetic field strength at the side facing the circulating support and reducing the magnetic field strength, and therefore the losses, at the side facing away from the circulating support.

The configuration of the Halbach array reportedly provides a rotating pattern of magnets (on the front face; on the left, up, right, down) and can theoretically be continued indefinitely. In real life the constructional limitations of course restrict the continuation of this pattern.

In order to further reduce stray losses and in order to support the effective magnetic field on the side facing the circulating support, in certain exemplary embodiments the alternating north-poles (+) and south-poles (−) on the side facing away from the circulating support are covered by a steel cover plate.

In still other embodiments, the circulating support includes an aluminum layer and a steel layer or other material having a magnetic permeability that is at least 40 times higher than the magnetic permeability of vacuum. The aluminum layer can be on top or beneath the steel layer or layer of material with a magnetic permeability that is at least 40 times higher than the magnetic permeability of vacuum.

In another exemplary aspect, the aluminum layer has a magnetic permeability that is comparable or a little higher than the magnetic permeability of a vacuum, but is sensitive to the inducement of eddy currents that counteract relative motion between the circulating support and the transfer means. This is in particular operational with relatively high differential speeds between the transfer means and the circulating support. On the other hand the steel layer or other material, which has a magnetic permeability that is at least 40 times higher than the magnetic permeability of vacuum, also counteracts relative motion between the circulating support and the transfer means, but at a relatively low differential speed between the transfer means and the circulating support. This latter braking function is caused by the magnetic attraction between the at least one magnet and the said steel layer or other material which has a magnetic permeability that is at least 40 times higher than the magnetic permeability of vacuum. This braking function can be less effective with higher differential speeds between the transfer means and the circulating support. The combination of the eddy current braking with the aluminum layer, and the magnetic braking with the layer with a comparably higher relative permeability underneath the aluminum layer can provide an optimum result in all practical situations at both lower and higher differential speeds between the transfer means and the circulating support.

In another exemplary aspect, the circulating support includes the aluminum layer and a material or a layer of material with a magnetic permeability in the range $0.75 \times 10^{-3}$ to $2.26 \times 10^{-3}$ Henry/meter. In one exemplary embodiment, the circulating support includes at least a layer of ferritic stainless steel. In another exemplary embodiment, the steel is industrial steel grade 1.4016 (EN) or 430 (ASTM).

In an advantageous and exemplary aspect, grease, blood and water have no impact on the operability of the eddy currents and of the magnetic attraction that counteract any such relative motion between the circulating support and the transfer means. The reliability of the accurate and timely transfer of poultry by the transfer units between the first line and the second line can therefore be tremendously improved. The braking means provided in accordance with the invention are moreover maintenance-free, since there is no physical contact between the circulating plate and the magnet of the transfer means that could cause wear and tear. Another advantage and exemplary aspect is that particularly with increasing speed of processing of poultry and accordingly higher rotational speeds of the circulating plate, the braking forces induced by the eddy currents are correspondingly increased.

In still another exemplary aspect, the layer of steel or other material with a magnetic permeability that is at least 40 times higher than the magnetic permeability of vacuum includes a series of equidistantly provided slits. The slits can be particularly functional to provide discrete interruptions of the braking forces applied by the magnetic attraction between the at least one magnet of the transfer means and the steel layer or other material which has a magnetic permeability that is at least 40 times higher than the magnetic permeability of vacuum as comprised in the circulating support. The feature in the previous sentence can be beneficial when the transfer means are blocked from further moving together with the circulating support at the time of weighing. Accurate weighing of the poultry suspended from the transfer means can then be effectively carried out, since the remaining braking function caused by the Eddy currents in the aluminum layer is then insufficient to have a notable adverse effect on the accuracy of the weighing.

In another exemplary aspect, it is found advantageous that between the series of alternating north-poles (+) and south-poles (−) facing the circulating support and the circulating support, an air gap is provided smaller than 30 mm and may be in the range 0.2-2 mm, or in the range 0.5-1.2 mm. This supports that the series of alternating north-poles (+) and south-poles (−) facing the circulating support provide a magnetic flux density at the surface of the circulating support of at least 0.2 T, or may be at least 0.5 T, or may be in the range 0.7 to 1.1 T.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of a non-limiting embodiment of a processing apparatus in accordance with the invention.

In the drawings.

Whenever in the figures the same reference numerals are applied, these numerals refer to the same parts.

DETAILED DESCRIPTION OF THE INVENTION

Figure 1:
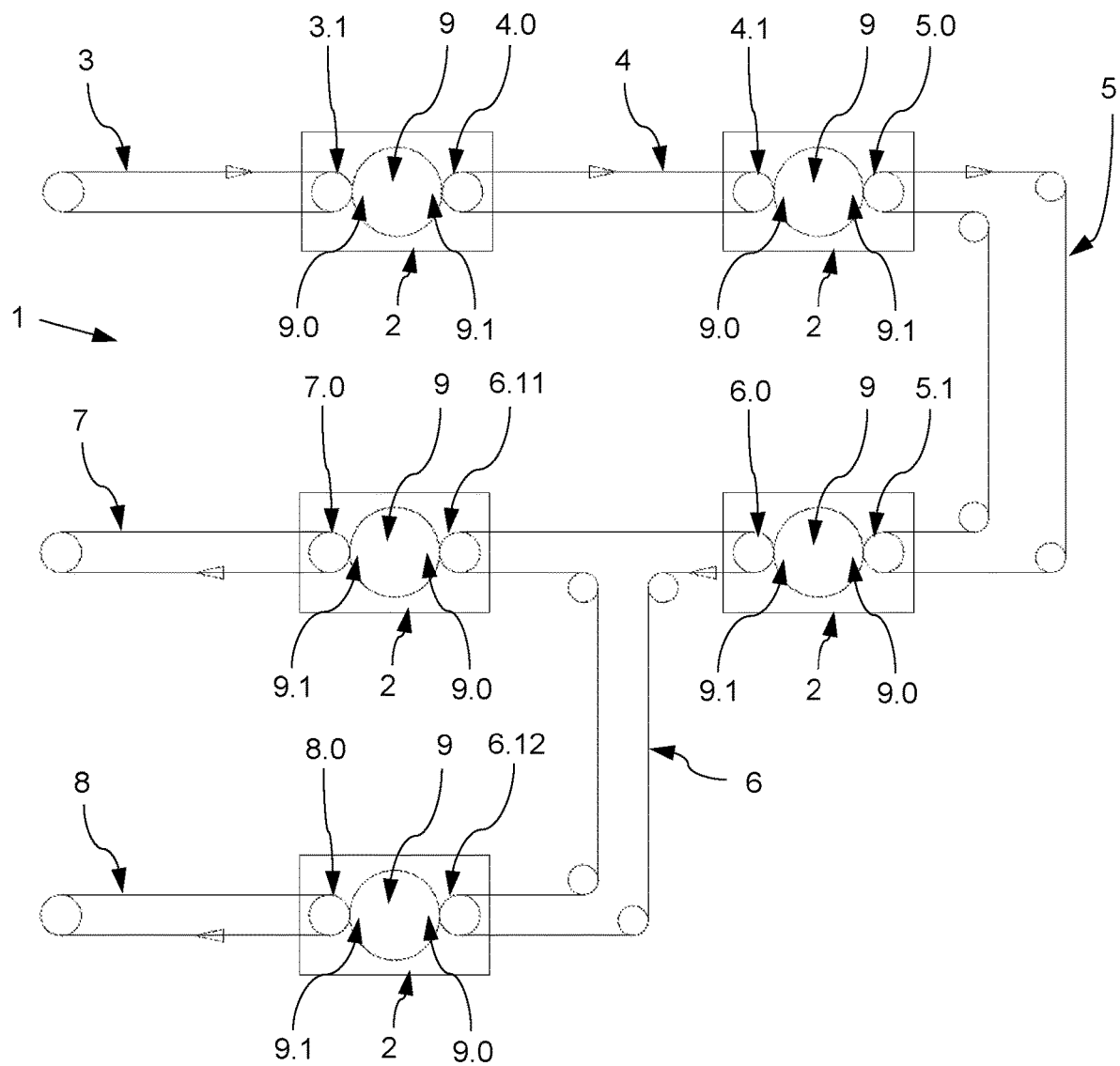
FIG. 1 schematically shows an exemplary processing apparatus of the invention.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents Referring now to FIG. 1, an exemplary processing apparatus 1 for poultry is shown that includes one or more transfer units 2 placed intermediate between processing lines. The transfer units 2 convey poultry from a first line to a subsequent second line, wherein both the first line and the second line are appropriately selected from the group including a slaughtering line 3, an evisceration line 4, a chilling line 5, a sorting line 6 and a cutup line 7, 8. Other types of lines are feasible as well. For this exemplary embodiment, each transfer unit 2 is embodied with a circulating support 9 and as shown in FIG. 2, on the circulating support 9 some of a plurality of transfer means 10 are mounted.

In accordance to what is shown in EP-B-0 736 255 and from EP-B-0 782 823 and which requires therefore no further elucidation, in a not obstructed situation the transfer means 10 do not carry out a relative movement with respect to the circulating support 9, yet in an obstructed situation the transfer means 10 are able to move relative to the support 9 or vice versa. Further in accordance with the prior art and what is shown in FIG. 1, the circulating support 9 is arranged to convey the said transfer means 10 that are shown in FIG. 2 between a supply station 3.1; 4.1; 5.1; 6.11, 6.12 at the side of a first line and a discharge station 4.0; 5.0; 6.0; 7.0; 8.0 at the side of a second line and vice versa.

Continuing with this exemplary embodiment, the transfer unit 9 is provided with a receiving station 9.0 that is drivable in synchronization with an adjacent supply station 3.1; 4.1; 5.1; 6.11, 6.12, and with a delivery station 9.1 which is drivable in synchronization with an adjacent discharge station 4.0; 5.0; 6.0; 7.0; 8.0. This is clearly disclosed in EP-B-0 736 255 and EP-B-0 782 823, incorporated herein by reference for all purposes, and requires therefore no further elucidation with reference to the drawing.

Figure 2:
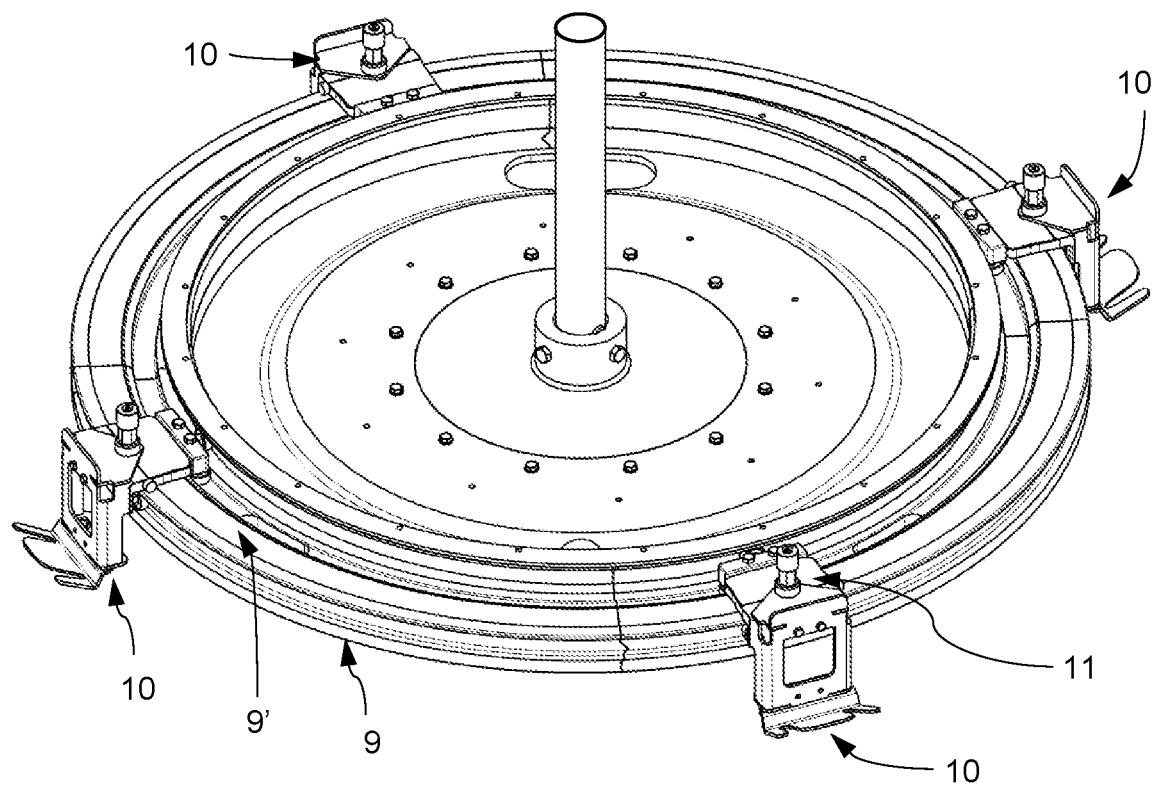
FIG. 2 shows a single transfer unit, several of which may be employed in the processing apparatus of the invention.

The circulating support 9 shown in FIGS. 1 and 2 includes at least near or at its rim 9' (that is where the transfer means 10 are located) material that is magnetically permeable and that each of the transfer means 10 (see in particular FIG. 3) is provided with at least one magnet 11 so as to induce eddy currents in the rim 9' of the) circulating support 9 that counteracts relative motion between the transfer means 10 and the circulating support 9.

Figure 3:
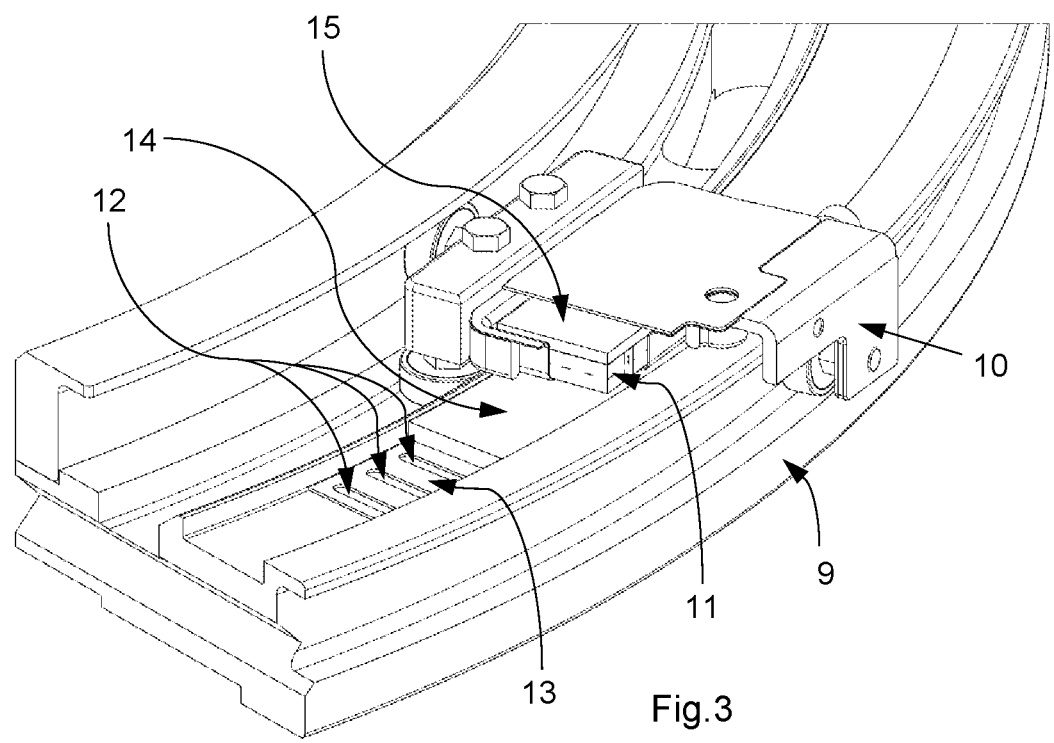
FIG. 3 shows a detail of the transfer unit of FIG. 2 and a single transfer means for use in the transfer unit of FIG. 2.

In FIG. 3, a detail is shown of the circulating support 9 at the location (near or at rim 9') where the transfer means 10 are provided. The single transfer means 10 shown in FIG. 3 is embodied with a magnet 11 for cooperation with the circulating support 9. FIG. 3 further shows that near or at the rim 9' the circulating support 9 includes an aluminium layer 14 that is sensitive to eddy currents induced by the magnet 11. Below the aluminium layer 14 is a layer 13 of steel or other material with a magnetic permeability that is at least 40 times higher than the magnetic permeability of vacuum. In one exemplary aspect, the material of layer 13 has a magnetic permeability in the range $0.75 \times 10^{-3}$-$2.26 \times 10^{-3}$ Henry/meter. Suitably the layer 13 of material is ferritic stainless steel, which is preferably of industrial steel grade 1.4016 (EN) or 430 (ASTM). The position of the aluminium layer 14 and the layer of steel or other material with a magnetic permeability that is at least 40 times higher than the magnetic permeability of vacuum, can also be interchanged.

It can further be seen in FIG. 3 that the layer 13 of steel or other material with a magnetic permeability that is at least 40 times higher than the magnetic permeability of vacuum includes a series of equidistantly provided slits 12. These slits 12 operate to provide accurate and discrete interruptions of the braking stops of the transfer means 10 on the circulating support 9, since the (at least one) magnet 11 of the transfer means 10 is only operable as a magnetic brake between the slits 12 where material is pre-sent. When the field lines of the magnet 11 are passing the slits 12 the transfer means 10 are no longer braked to the fullest or braked to a much lesser extent, and accurate weighing of the poultry suspended from the transfer means 10 can then be effectively carried out.

Figure 4:
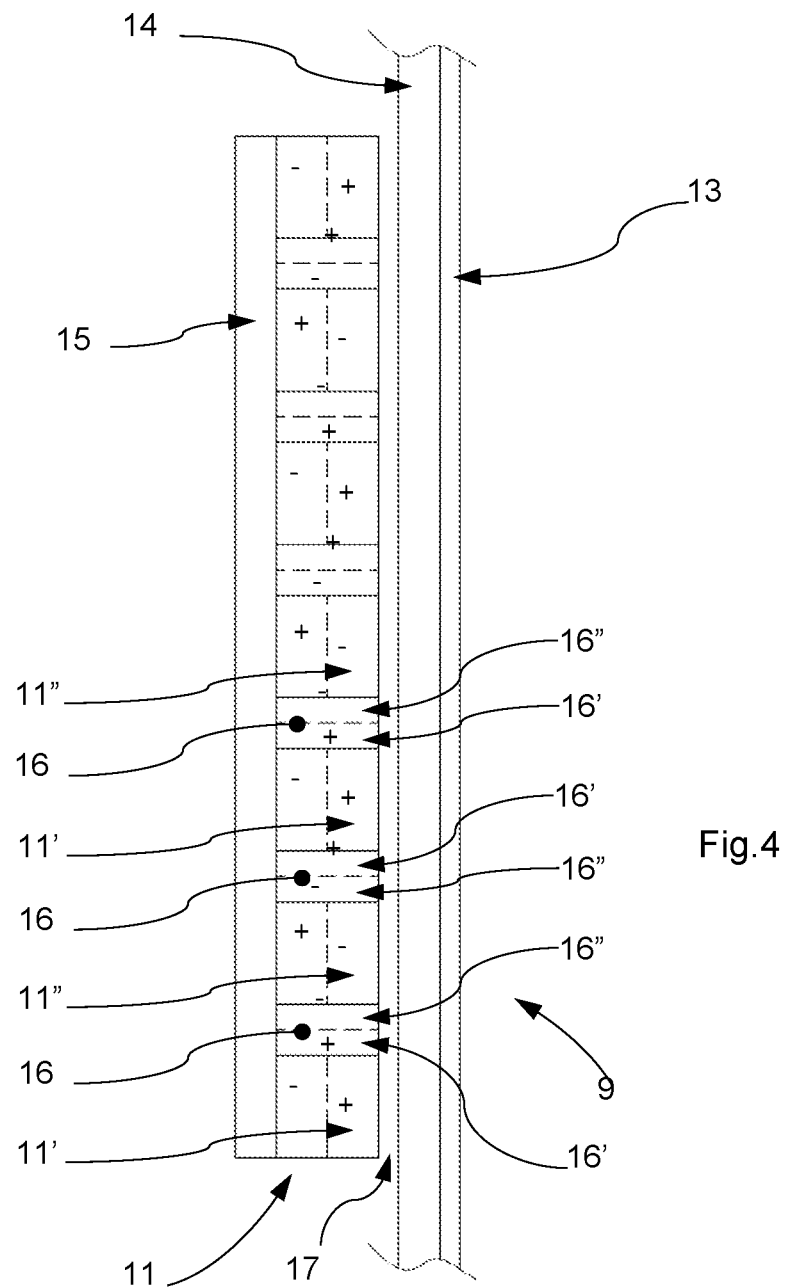
FIG. 4 shows a sectional side view of the rim of the circulating support used and magnet used in the processing apparatus of the invention.

With reference to FIG. 4 the configuration of the at least one magnet 11 is shown. FIG. 4 depicts that the (at least one) magnet 11 is embodied with a series of alternating north-poles (+) 11' and south-poles (−) 11" facing the circulating support 9, and that sandwiched between each of these alternating north-poles (+) 11' and south-poles (−) 11" a combination 16 of a north-pole (+) 16' and a south-pole (−) 16" is provided, which combination 16 of north-pole (+) 16' and south-pole (−) 16" is shifted over an angle of π\2 (pi/2) radians or 90° with reference to the alternating north-poles (+) 11' and south-poles (−) 11" on opposite sides of the said combination 16 of north-pole (+) 16' and south-pole (−) 16", wherein at the side facing the circulating sup-port 9 a north-pole (+) 11' of the series of alternating north-poles (+) 11' and south-poles (−) 11" is immediately adjacent to a north-pole (+) 16' of the shifted combination 16 of a north-pole (+) 16' and south-pole (−) 16", and wherein at the side facing the circulating support 9 a south-pole (−) 11" of the series of alternating north-poles (+) 11' and south-poles (−) 11" is immediately adjacent to a south-pole (−) 16" of the shifted combination 16 of a north-pole (+) 16' and south-pole (−) 16". This facilitates that the magnet or magnets 11 are arranged to provide a magnetic flux density at the surface of the circulating support 9 of at least 0.2 T in some embodiments, or of at least 0.5 T in some embodiments, or in the range 0.7 to 1.1 T in still other embodiments.

FIGS. 3 and 4 show that the alternating north-poles (+) and south-poles (−) on the side facing away from the circulating support 9 are covered by a steel cover plate 15, and furthermore FIG. 4 shows that between the series of alternating north-poles (+) and south-poles (−) facing the circulating support 9 and the circulating support 9 an air gap 17 is provided smaller than 30 mm in some embodiments, or in the range 0.2 to 2 mm in other embodiments, or in the range 0.5 to 1.2 mm in still other embodiments.

The applicant wishes to point out that the foregoing description with reference to the drawing is merely intended to elucidate the appended claims without limiting these claims to the discussed embodiment. The scope of protection that merits the invention is exclusively determined by the appended claims, wherein any possible ambiguity can be resolved with reference to the discussed embodiment.

Although the invention has been discussed in the foregoing with reference to exemplary embodiments of a system and method according to the invention, the invention is not restricted thereto, and the system and method can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims to these exemplary embodiments. The scope of protection of the invention shall therefore be construed in accordance with the appended claims only, wherein a possible ambiguity in the wording of the claims shall be resolved using these exemplary embodiments.

What is claimed is:

1. A processing apparatus for poultry, comprising:
   one or more transfer units placed intermediate and conveying poultry from a first line to a subsequent second line, wherein each transfer unit comprises
   a circulating support onto which a plurality of transfer means are mounted that in a not obstructed situation do not carry out a relative movement with respect to the support, yet in an obstructed situation are able to move relative to the support, the circulating support arranged to convey the transfer means between a supply station at the side of the first line and a discharge station at the side of the second line and vice versa;
   the transfer means provided with at least one magnet so as to induce eddy currents in the circulating support that counteracts relative motion between the transfer means and the circulating support;
   wherein the circulating support comprises material susceptible to eddy currents;
   wherein the at least one magnet is embodied with a series of alternating north-poles (+) and south-poles (−) facing the circulating support, and sandwiched between each of these alternating north-poles (+) and south-poles (−) is a combination of a north-pole (+) and a south-pole (−), which combination of north-pole (+) and south-pole (−) is shifted over an angle of π\2 (pi/2) radians or 90° with reference to the alternating north-poles (+) and south-poles (−) on opposite sides of the combination of north-pole (+) and south-pole (−);

wherein at the side facing the circulating support a north-pole (+) of the series of alternating north-poles (+) and south-poles (−) is immediately adjacent to a north-pole (+) of the shifted combination of a north-pole (+) and south-pole (−);

wherein at the side facing the circulating support a south-pole (−) of the series of alternating north-poles (+) and south-poles (−) is immediately adjacent to a south-pole (−) of the shifted combination of a north-pole (+) and south-pole (−); and wherein the alternating north-poles (+) and south-poles (−) on the side facing away from the circulating support are covered by a steel cover plate.

2. The processing apparatus according to claim 1, wherein the circulating support comprises an aluminum layer and a layer of steel or other material with a magnetic permeability that is at least 40 times higher than the magnetic permeability of a vacuum.

3. The processing apparatus according to claim 2, wherein the layer of steel or other material with a magnetic permeability that is at least 40 times higher than the magnetic permeability of a vacuum comprises a series of equidistantly provided slits.

4. The processing apparatus according to claim 1, wherein between the series of alternating north-poles (+) and south-poles (−) facing the circulating support and the circulating support an air gap is provided that is in the range of 0.2 mm to 2 mm.

5. The processing apparatus according to claim 1, wherein between the series of alternating north-poles (+) and south-poles (−) facing the circulating support and the circulating support an air gap is provided that is in the range of 0.5 mm to 1.2 mm.

6. The processing apparatus according to claim 1, wherein the series of alternating north-poles (+) and south-poles (−) facing the circulating support provide a magnetic flux density at the surface of the circulating support of at least 0.2 T.

7. The processing apparatus according to claim 1, wherein the series of alternating north-poles (+) and south-poles (−) facing the circulating support provide a magnetic flux density at the surface of the circulating support of at least 0.5 T.

8. The processing apparatus according to claim 1, wherein the series of alternating north-poles (+) and south-poles (−) facing the circulating support provide a magnetic flux density in the range 0.7 T to 1.1 T.

9. The processing apparatus according claim 1, wherein the transfer unit is provided with a receiving station which is drivable in synchronization with the supply station, and the transfer unit is provided with a delivery station which is drivable in synchronization with the discharge station.

10. The processing apparatus according claim 1, wherein the-wherein both the first line and the second line are selected from the group comprising a slaughtering line, an evisceration line, a chilling line, a sorting line, and a cutup line.

11. A processing apparatus for poultry, comprising:
one or more transfer units placed intermediate and conveying poultry from a first line to a subsequent second line, wherein each transfer unit comprises:
a circulating support onto which a plurality of transfer means are mounted that in a not obstructed situation do not carry out a relative movement with respect to the support, yet in an obstructed situation are able to move relative to the support, the circulating support arranged to convey the transfer means between a supply station at the side of the first line and a discharge station at the side of the second line and vice versa;
the transfer means provided with at least one magnet so as to induce eddy currents in the circulating support that counteracts relative motion between the transfer means and the circulating support;
wherein the circulating support comprises a first layer of material sensitive to eddy currents and a second layer of material having a magnetic permeability that is at least 40 times higher than the magnetic permeability of a vacuum;
wherein the at least one magnet is embodied with a series of alternating north-poles (+) and south-poles (−) facing the circulating support, and sandwiched between each of these alternating north-poles (+) and south-poles (−) is a combination of a north-pole (+) and a south-pole (−), which combination of north-pole (+) and south-pole (−) is shifted over an angle of π\2 (pi/2) radians or 90° with reference to the alternating north-poles (+) and south-poles (−) on opposite sides of the combination of north-pole (+) and south-pole (−);
wherein at the side facing the circulating support a north-pole (+) of the series of alternating north-poles (+) and south-poles (−) is immediately adjacent to a north-pole (+) of the shifted combination of a north-pole (+) and south-pole (−);
wherein at the side facing the circulating support a south-pole (−) of the series of alternating north-poles (+) and south-poles (−) is immediately adjacent to a south-pole (−) of the shifted combination of a north-pole (+) and south-pole (−);
wherein at a side facing away from the circulating support the at least one magnet is covered by a layer of steel.

* * * * *